(12) United States Patent
Harding et al.

(10) Patent No.: US 6,686,464 B1
(45) Date of Patent: Feb. 3, 2004

(54) CELLULOSE ETHERS AND METHOD OF PREPARING THE SAME

(75) Inventors: Roger Bruce Harding, Memphis, TN (US); Susan L. H. Crenshaw, Memphis, TN (US); Paul Eugene Gregory, Germantown, TN (US); Denise Hartnett Broughton, Cordova, TN (US)

(73) Assignee: BKI Holding Corporation, Wilmington, DE (US)

( * ) Notice: Subject to any disclaimer, the term of this patent is extended or adjusted under 35 U.S.C. 154(b) by 0 days.

(21) Appl. No.: 09/704,258

(22) Filed: Nov. 1, 2000

Related U.S. Application Data (63) Continuation-in-part of application No. 09/557,804, filed on Apr. 25, 2000.
(60) Provisional application No. 60/131,092, filed on Apr. 26, 1999.

(51) Int. Cl.[7] .................................................. C08B 11/00
(52) U.S. Cl. ............................ 536/84; 536/97; 536/98
(58) Field of Search ................................ 536/84, 97, 98

(56) References Cited

U.S. PATENT DOCUMENTS

| | | | |
|---|---|---|---|
| 1,415,023 A | 5/1922 | Donohue | |
| 1,704,304 A | 3/1929 | Sessler | |
| 1,854,331 A | 4/1932 | Dosne | |
| 1,860,432 A | 5/1932 | Richter | |
| 1,938,360 A | * 12/1933 | Traill | 536/94 |
| 2,038,678 A | 4/1936 | Richter et al. | 260/152 |
| 2,067,946 A | * 1/1937 | Picton | 536/85 |
| 2,090,808 A | 8/1937 | Richter | 260/152 |
| 2,228,127 A | * 1/1941 | Richter | 162/73 |
| 2,241,397 A | 5/1941 | Fordyce et al. | 260/231 |
| 2,488,631 A | 11/1949 | Kunz | 260/231 |
| 2,636,879 A | 4/1953 | Branan et al. | 260/231 |
| 2,687,352 A | 8/1954 | Hoos | 92/13 |
| 3,131,176 A | 4/1964 | Klug | 260/231 |
| 3,131,177 A | 4/1964 | Klug | 260/231 |
| 3,284,441 A | 11/1966 | Bishop et al. | 260/231 |
| 3,322,748 A | 5/1967 | Tokimatsu et al. | 260/212 |
| 3,457,047 A | 7/1969 | Tokimatsu et al. | 23/260 |
| 3,652,539 A | 3/1972 | Mura et al. | 260/231 |
| 3,926,951 A | 12/1975 | Llndenfors et al. | 260/231 |
| 4,001,211 A | 1/1977 | Sarkar | 536/84 |
| 4,063,018 A | 12/1977 | Ohnaka et al. | 536/98 |
| 4,084,060 A | 4/1978 | Glass, Jr. et al. | 536/96 |
| 4,096,326 A | 6/1978 | Reid | 536/95 |
| 4,250,305 A | 2/1981 | Saito et al. | 536/84 |
| 4,292,426 A | 9/1981 | Orii et al. | 536/95 |
| 4,339,573 A | * 7/1982 | Wust et al. | 536/84 |
| 4,399,275 A | * 8/1983 | Sears | 536/70 |
| 4,460,766 A | 7/1984 | Felcht et al. | 536/84 |
| 4,491,661 A | 1/1985 | Bredereck et al. | 536/84 |
| 4,507,474 A | 3/1985 | Raehse et al. | 536/97 |
| 4,508,895 A | 4/1985 | Balser | 536/91 |
| 4,526,961 A | 7/1985 | Perplies et al. | 536/98 |
| 4,547,570 A | 10/1985 | Garner | 536/84 |
| 4,661,589 A | 4/1987 | Adams et al. | 536/91 |
| 4,820,813 A | 4/1989 | Schulz | 536/84 |

(List continued on next page.)

FOREIGN PATENT DOCUMENTS

| | | | |
|---|---|---|---|
| DE | 148 342 | 5/1981 | ........... C08B/15/04 |
| DE | 146462 | 11/1981 | ........... C08B/11/12 |
| EP | 0390240 | 10/1990 | ......... C08B/11/193 |
| EP | 0539979 | 5/1993 | ......... C08B/11/193 |
| EP | 0 879 827 | 11/1998 | ........... C08B/11/12 |
| EP | 879827 A2 * | 11/1998 | ........... C08B/11/12 |
| JP | 403002201 | 1/1991 | ........... C08B/11/93 |
| SU | 738404 | 6/1980 | ........... C08B/11/12 |
| SU | 952853 | 8/1982 | ........... C08B/11/12 |
| SU | 1028676 | 7/1983 | ........... C08B/11/12 |
| WO | WO 00/32637 | 6/2000 | ........... C08B/11/20 |
| WO | WO 00/39390 | 7/2000 | ............ D21C/9/00 |
| WO | 00/65145 | 11/2000 | ............ D21C/3/02 |
| WO | WO00/71586 A1 | 11/2000 | ........... C08B/11/08 |

OTHER PUBLICATIONS

"Effect of some pretreatments on carboxymethylation rate and water uptake of cellulosic fibers", Fardous Mobarak and Abd–alla, *svensk papperastidning 1983*, pp. R120–R127.

Encyclopedia of Polymer Science and Engineering, vol. 3, John Wiley & Sons, pp. 226–269.

Herrick, Franklin W., High Molecular Weight Fibrous Cellulose Di– and Triacetates, International Dissolving and Specialty Pulps, 1983, TAPPI Proceedings, pp. 89–98.

(List continued on next page.)

*Primary Examiner*—Dwayne C. Jones
(74) *Attorney, Agent, or Firm*—Darby & Darby P.C.

(57) ABSTRACT

The present inventors have discovered that the solution rheology of cellulose ethers prepared from cellulose pulp is altered by mercerizing and recovering cellulose pulp before preparing the cellulose ethers. For example, the solution viscosity of carboxymethyl cellulose (CMC) produced from mercerized and recovered cellulose pulp is significantly greater than that produced from non-mercerized cellulose pulp. The present invention provides a method of preparing cellulose ethers comprising the steps of (a) obtaining mercerized and recovered cellulose pulp, and (b) converting the mercerized and recovered cellulose pulp into the cellulose ethers. The mercerized cellulose pulp is typically substantially free of cellulose III. Mercerized cellulose pulp prepared by this method has a greater percentage of crystalline cellulose II and a smaller crystalline area than that of non-mercerized cellulose pulp. The present invention also provides a method of preparing a cellulose floc comprising the steps of (a) obtaining mercerized and recovered cellulose pulp, and (b) treating the mercerized pulp to form the cellulose floc. Alternatively, the method comprises mercerizing and recovering a cellulose floc. Cellulose floc prepared by this method have a greater bulk density than cellulose floc prepared from similar non-mercerized cellulose pulp. Furthermore, the bulk density gain is greater than that expected from the coarseness (weight per unit of fiber length) gain from preparing a cellulose floc.

4 Claims, 2 Drawing Sheets

U.S. PATENT DOCUMENTS

| | | | |
|---|---|---|---|
| 4,845,206 A | 7/1989 | Thomson et al. | 536/84 |
| 4,941,943 A | 7/1990 | Edelman et al. | 162/9 |
| 5,013,832 A | 5/1991 | Raehse et al. | 536/90 |
| 5,140,099 A | 8/1992 | Bostrom et al. | 536/91 |
| 5,385,607 A | 1/1995 | Kiesewetter et al. | 106/197.1 |
| 5,410,034 A | 4/1995 | Isogai et al. | 536/56 |
| 5,476,668 A | 12/1995 | Kobayashi et al. | 424/494 |
| 5,550,189 A | 8/1996 | Qin et al. | 525/54.3 |
| 5,858,021 A | 1/1999 | Sun et al. | 8/125 |

OTHER PUBLICATIONS

Sarkar, Nitis, Kinetics of thermal gelation of methylcellulose and hydroyxpropylmethylcellulose in aqueous solutions, Carbohydrate Polymers 26 (1995) pp. 195–203.

Sarkar, Nitis, Thermal Gelation Properties of Methyl and Hydroxypropyl Methylcellulose, Journal of Applied Polymer Science, vol. 24 (1979) pp. 1073–1087.

* cited by examiner

CELLULOSE ETHERS AND METHOD OF PREPARING THE SAME

This application is a continuation-in-part of U.S. Ser. No. 09/557,804, filed Apr. 25, 2000, and claims the benefit of U.S. Ser. No. 60/131,092, filed Apr. 26, 1999.

FIELD OF THE INVENTION

This invention relates to cellulose ethers and a method of preparing the same from mercerized and recovered cellulose pulp. This invention also relates to a method of preparing cellulose floc with increased bulk density from mercerized and recovered cellulose pulp.

BACKGROUND OF THE INVENTION

Cellulose ethers have widespread application in thickening agents (e.g. in food additives), bonding agents (e.g. in lacquers and other paints), adhesives, printing pastes, suspension stabilizing agents, thermoplastic materials, protective colloids, emulsion stabilizers, finishing compositions (e.g. in textiles), coating compositions (e.g. in paper and paper products), plastic sheets (e.g. in packaging or textiles), and film-forming agents. See, for example, Cellular Materials to Composites, Volume 3, Chapter "Cellulose Ethers", pages 226–269, Encyclopedia of Polymer Science and Engineering, $2^{nd}$ Ed., 1985, John Wiley & Sons, New York. Many of these applications benefit from the relatively high viscosity of cellulose ethers (e.g. petroleum production fluids). Prior to the present invention, the solution viscosity of cellulose ethers have primarily been increased by increasing the degree of polymerization (DP) or viscosity of the cellulose pulp used to make the cellulose ethers, or by protecting against DP or viscosity degradation during pulp grinding and other processes performed during cellulose ether manufacturing.

For example, if a specific solution viscosity is desired for the cellulose ethers, the appropriate cellulose pulp viscosity is determined and a cellulose pulp having this viscosity is selected. This raw material selection strategy is also employed by ether producers to increase production throughput by using higher density cellulose floc.

Cellulose ethers are typically produced by alkalating cellulose with an alkalating agent, such as sodium hydroxide, to form an alkali cellulose and then etherifying the alkali cellulose. See, for example, U.S. Pat. Nos. 2,067,946; 2,636,879; 4,063,018; 4,250,305; 4,339,573; and 4,547,570. The cellulose pulp may be shortened or granulated into a cellulose floc before being alkalated. See, for example, U.S. Pat. Nos. 2,067,946; 2,636,879; and 4,339,573.

Edelman et al., U.S. Pat. No. 4,941,943, disclose a pretreatment process for preparing sodium carboxymethyl cellulose. The pretreatment process includes slushing cellulose to a consistency of about 5–15% to form a fibre suspension, concentrating the fibre suspension to a consistency of about 25–35% to form a pulp, and homogenizing the pulp. After the fibre suspension has been concentrated, the pulp is mercerized to form activated cellulose (or alkali cellulose). The mercerization step may occur before, after, or concurrently with the homogenizing step. After the pretreatment process, the activated cellulose is etherified to form the sodium carboxymethyl cellulose.

Orii et al., U.S. Pat. No. 4,292,426, disclose a process for preparing hydroxylpropyl cellulose. The process requires swelling cellulose, driving out excess caustic soda solution from the swollen cellulose to form a dehydrated cellulose, and obtaining an alkali cellulose by washing with an aqueous caustic solution and drying the dehydrated cellulose. The alkali cellulose is washed in order to reduce the alkali content of the dehydrated cellulose. The resulting alkali cellulose has a sodium hydroxide to cellulose ratio of 0.05 to 0.16 and a water to cellulose ratio of 0.2 to 0.5. The process further comprises reacting the alkali cellulose with propylene oxide until the molar substitution is between 1 and 2, adding 0.2 to 0.7 parts of water for every one part of cellulose in the raw material alkali cellulose, and continuing the etherification reaction until the molar substitution is higher than 2.5.

Bredereck et al., U.S. Pat. No. 4,491,661, disclose a process for preparing water-soluble cellulose ethers comprising activating cellulose with ammonia, alkalizing the activated cellulose with an alkalizing agent in the presence of ammonia, removing the ammonia from the alkali cellulose in the presence of the alkalizing agent, and etherifying the alkali cellulose with an etherifying agent in the presence of an organic solvent. When cellulose is activated with liquid ammonia, crystalline cellulose III is formed. As well known in the art, crystalline cellulose III has a significantly different structure and properties than other crystalline cellulose structures, such as crystalline cellulose II. See, for example, Rydholm, supra; and Ott, Spurlin and Grafflin, supra.

Laskowksi et al., DDR Patent No. 146,462, disclose a process for preparing low substituted, water soluble carboxymethyl cellulose having a degree of substitution less than 0.5. The process includes activating cellulose with liquid ammonia, steaming off the ammonia, alkalizing the activating cellulose with sodium hydroxide, and carboxymethylizing the alkalized cellulose.

Dautzenberg et al., DDR Patent No. 148,342, disclose a process for preparing carboxymethyl cellulose with increased solution viscosity. The process includes activating cellulose with liquid ammonia, alkalizing the activated cellulose, and carboxymethylizing the alkalized cellulose.

There is a need for a method of preparing cellulose ethers which increases throughput and in which the solution viscosity of the cellulose ethers may be controlled by process conditions, not just the viscosity of the starting raw materials. There is also a need for a method of preparing cellulose floc which increases the bulk density per number average floc length.

SUMMARY OF THE INVENTION

The present inventors have discovered that the solution rheology of cellulose ethers prepared from cellulose pulp is altered by mercerizing and recovering cellulose pulp before preparing the cellulose ethers. For example, the solution viscosity of carboxymethyl cellulose (CMC) produced from mercerized and recovered cellulose pulp is significantly greater than that produced from non-mercerized cellulose pulp.

The present invention provides a method of preparing cellulose ethers comprising the steps of (a) obtaining mercerized and recovered cellulose pulp, and (b) converting the mercerized and recovered cellulose pulp into the cellulose ethers. According to one embodiment, when the cellulose pulp is southern softwood kraft, the mercerized cellulose pulp has a TAPPI 230 om-89 viscosity greater than 12 cP. This method, however, may be applied to all cellulose pulps, regardless of their viscosities, including those which, when mercerized, have a viscosity less than 12 cP. The mercerized cellulose pulp is typically substantially free of cellulose III. Mercerized cellulose pulp prepared by this method has a greater percentage of crystalline cellulose II and a smaller crystalline area than that of non-mercerized cellulose pulp.

According to a preferred embodiment, the method comprises the steps of (a) obtaining mercerized and recovered cellulose pulp, (b) treating the mercerized and recovered cellulose pulp to form a cellulose floc, (c) alkalating the cellulose floc to form an alkali cellulose, and (d) etherifying the alkali cellulose to form a cellulose ether. According to an alternative embodiment, steps (a) and (b) are reversed, i.e., the cellulose pulp is treated to form a cellulose floc and then the cellulose floc is mercerized and recovered.

The present invention also provides a method of preparing a cellulose floc comprising the steps of (a) obtaining mercerized and recovered cellulose pulp, and (b) treating the mercerized pulp to form the cellulose floc. According to one embodiment, when the cellulose pulp is southern softwood kraft, the mercerized cellulose pulp has a TAPPI 230 om-89 viscosity greater than 12 cP. This method, however, may be applied to all cellulose pulps, regardless of their viscosities, including those which, when mercerized, have a viscosity less than 12 cP. Alternatively, the method comprises mercerizing and recovering a cellulose floc. Cellulose floc prepared by this method have a greater bulk density than cellulose floc prepared from similar non-mercerized cellulose pulp. Furthermore, the bulk density gain is greater than that expected from the coarseness (weight per unit of fiber length) gain from preparing a cellulose floc.

Yet another embodiment is a method of preparing cellulose ethers comprising the steps of (a) selecting a desired viscosity for the cellulose ethers, (b) obtaining a mercerized and recovered cellulose pulp having the appropriate viscosity for yielding cellulose ethers having the selected viscosity, and (c) converting the mercerized and recovered cellulose pulp to the cellulose ethers. According to one embodiment, when the cellulose pulp is southern softwood kraft, the mercerized cellulose pulp typically has a TAPPI 230 om-89 viscosity greater than 12 cP. This method, however, may be applied to all cellulose pulps, regardless of their viscosities, including those which, when mercerized, have a viscosity less than 12 cP.

DETAILED DESCRIPTION OF THE INVENTION

It has been surprisingly discovered that cellulose ethers prepared from previously mercerized and recovered cellulose pulp have significantly different solution rheologies than similar cellulose ethers prepared from non-mercerized cellulose pulp. For example, the viscosity of the cellulose ethers prepared may be controlled by varying the process parameters such as by varying the degree of mercerization. As a result, manufacturers can use the same type of cellulose pulp, e.g., southern softwood kraft (SSK), and processing equipment to yield cellulose ethers having a broader range of solution rheologies without changing types of cellulose pulp or processing equipment. For certain cellulose ethers, such as carboxymethyl cellulose, the use of mercerized and recovered cellulose pulp as a starting material significantly increases the solution viscosity of the cellulose ether. The increases in solution viscosity offer cellulose ether manufacturers (and end product users) the opportunity to compete with a broader range of synthetic and other natural water-soluble polymers, develop new applications for cellulose ethers, and improve current product performance.

Figure 1:
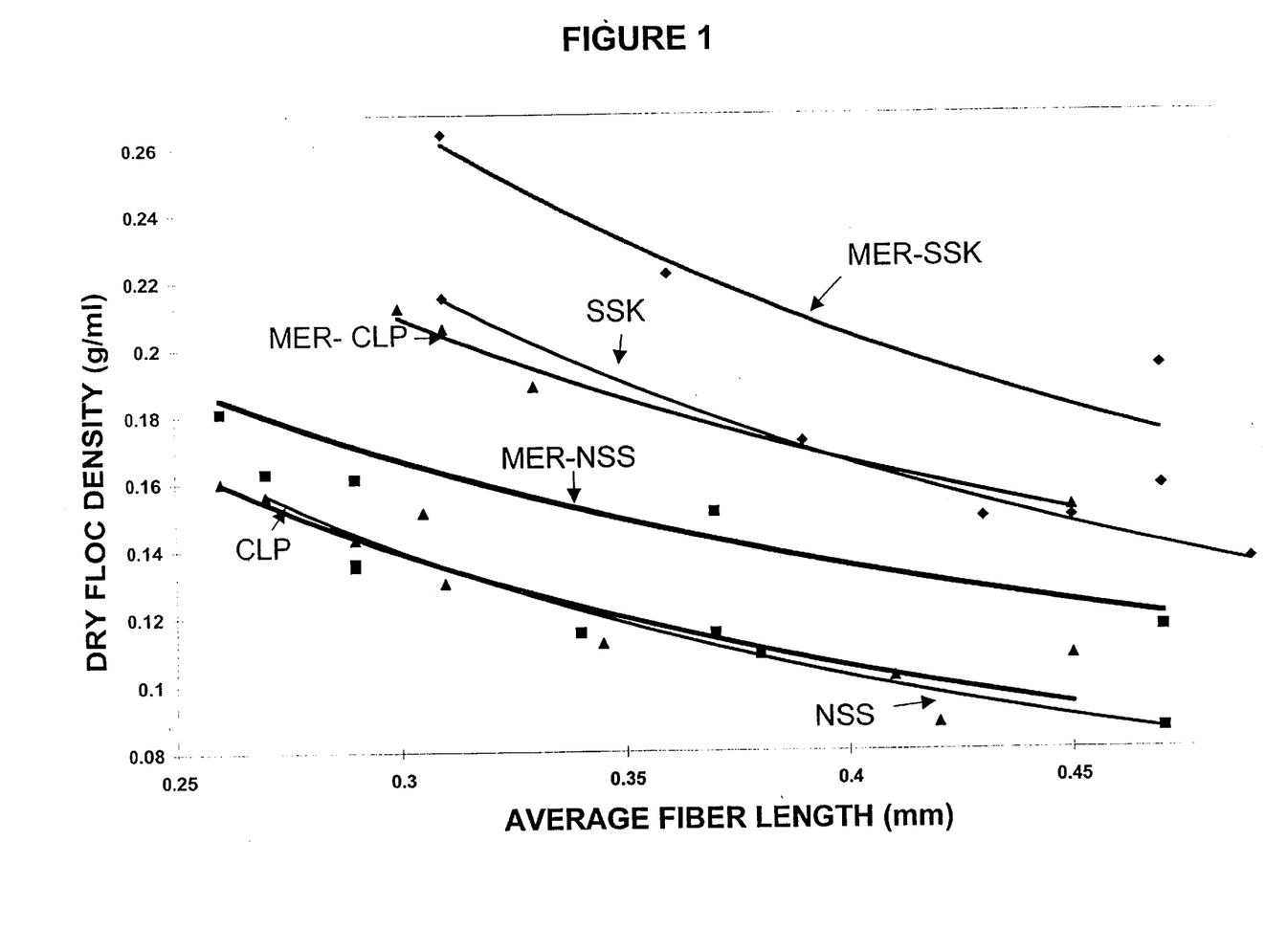
FIG. 1 is a line graph of the dry floc density of cellulose floc prepared from mercerized and non-mercerized southern softwood kraft, northern softwood sulfite, and cotton linters pulp versus the number average fiber length of the floc.

The inventors have also discovered that cellulose floc prepared from mercerized and recovered cellulose pulp is denser than that prepared from non-mercerized cellulose floc. The term "cellulose floc" as used herein is defined as the material resulting from the reduction of fiber lengths in cellulose pulp, irrespective of whether the sheet or bulk materials have been diced, shredded or ground to shorter lengths. The increase in floc density allows cellulose ether producers to increase mill throughput. As illustrated in FIG. 1, mercerized fibers for cotton linters pulp (CLP), southern softwood kraft (SSK), and northern softwood sulfite (NSS) all have higher floc densities than their non-mercerized counterparts, irrespective of floc (fiber) length. For example, ground cellulose floc generally has a floc tap density of from about 20 to about 60% greater than that of similar floc derived from non-mercerized cellulose pulp. This density difference offers a significant advantage in reactor loading and manufacturing throughput to ether producers.

Preparation of the Mercerized and Recovered Cellulose Pulp

The mercerized and recovered cellulose pulp may be prepared by (i) mercerizing cellulose pulp, (ii) washing, neutralizing, or washing and neutralizing the mercerized cellulose pulp, and (iii) optionally, drying the mercerized cellulose pulp.

Any cellulose pulp known in the art may be used as the starting material. Suitable sources of cellulose pulp include, but are not limited to, cotton linters pulps, hardwood cellulose pulps (e.g. hardwood krafts), softwood cellulose pulps (e.g. softwood krafts), sulfite cellulose pulps (e.g. softwood and hardwood sulfites), kraft cellulose pulps, rehydrated cellulose pulps, and any combination of any of the foregoing. Suitable hardwood cellulose pulps include, but are not limited to, southern hemisphere hardwood kraft cellulose pulps, southern hemisphere hardwood sulfite cellulose pulps, Scandinavian hardwood kraft cellulose pulps, Scandavian hardwood sulfite cellulose pulps, northern hardwood kraft cellulose pulps (NHK), northern hardwood sulfite cellulose pulps, southern hardwood kraft cellulose pulps (SHK), southern hardwood sulfite cellulose pulps, tropical hardwood kraft cellulose pulps, tropical hardwood sulfite cellulose pulps, and any combination of any of the foregoing. Suitable softwood cellulose pulps include, but are not limited to, southern hemisphere softwood kraft cellulose pulps, southern hemisphere softwood sulfite cellulose pulps, Scandinavian softwood kraft cellulose pulps, Scandinavian softwood sulfite cellulose pulps, southern softwood kraft cellulose pulps (SSK), northern softwood kraft cellulose pulps (NSK), southern softwood sulfite cellulose pulps (SSS), northern softwood sulfite cellulose pulps (NSS), and any combination of any of the foregoing. Suitable sulfite cellulose pulps include, but are not limited to, southern softwood sulfite cellulose pulps, northern softwood sulfite cellulose pulps, tropical hardwood sulfite cellulose pulps, and any combination of any of the foregoing. Special mention is made of cotton linters pulp, softwood sulfite cellulose pulps, and never dried cellulose pulps.

The cellulose pulp may be a mixture of two or more different cellulose pulps. Preferably, the cellulose pulp is not regenerated cellulose pulp. Kraft cellulose pulps which are suitable for the present invention may optionally be prehydrolyzed. Also, the cellulose pulp may be a cellulose floc of any of the aforementioned materials.

The cellulose pulp may be mercerized by any method known in the art, such as that described in, for example, Rydholm, ed. *Pulping Processes* (Interscience Publishers, 1965) and Ott, Spurlin and Grafflin, eds, *Cellulose and Cellulose Derivatives*, Vol. V, Part 1 (Interscience Publishers, 1954), which are incorporated herein by reference. Mercerization converts cellulose from its native form, cellulose I, to a more thermodynamically stable form, such as cellulose II. Cellulose pulp may be mercerized by reacting the pulp with a mercerizing agent, such as a mercerizing agent which converts cellulose I to cellulose II (i.e. a cellulose II mercerizing agent). According to one preferred embodiment, the mercerizing agent is not ammonia or an amine.

Suitable mercerizing agents include, but are not limited to, alkali metal hydroxides, such as sodium hydroxide (NaOH), lithium hydroxide (LiOH), potassium hydroxide (KOH), and rubidium hydroxide (RbOH); benzyltrimethylammonium hydroxide (BTMOH); and any combination of any of the foregoing.

According to a preferred embodiment, the mercerizing agent is sodium hydroxide. The cellulose pulp is generally treated with an aqueous solution having from about 6.5 to about 50% and preferably from about 7 to about 24% by weight of sodium hydroxide, based upon 100% weight of total aqueous solution. This corresponds to concentrations of from about 70 to about 764 grams/liter (g/l) of sodium hydroxide and from about 75 to about 300 g/l of sodium hydroxide, respectively. The cellulose pulp may also be treated with an aqueous solution having from about 9 to about 50%, from about 10 to about 50%, from about 13 to about 50%, from about 16 to about 50%, from about 18 to about 50%, from about 9 to about 24%, from about 10 to about 24%, from about 13 to about 24%, from about 16 to about 24%, or from about 18 to about 24% by weight of sodium hydroxide, based upon 100% weight of total aqueous solution. Typically, the cellulose pulp is treated under agitation with the mercerizing agent at a temperature of about 20° C. or higher.

Mercerization may be performed during or after the pulp producing process including, during and after digesting, bleaching, purification, and drying. The mercerization step may also be performed on rehydrated cellulose pulp. According to a preferred embodiment, mercerization is performed during bleaching and/or purification processing during pulp production.

According to a preferred environment, the mercerization is performed in an environment substantially free of oxygen, such as under nitrogen. Oxygen can cause disruptions in the polymer chains resulting in a lower viscosity final product.

The mercerization is typically performed in an environment which is substantially free of etherification agents and more preferably in an environment which contains less than about 0.1% by weight of etherification agent, based upon 100% total weight of cellulose pulp and etherification agent. Most preferably, the mercerization is performed without any etherification agent present.

After mercerization, the cellulose pulp preferably contains at least about 20%, more preferably at least about 35%, and most preferably about 60% by weight of cellulose II, based upon 100% total weight of the crystalline portion of the cellulose pulp. Typically, the crystalline portion only consists of cellulose I and cellulose II.

The cellulose pulp is then recovered from the mixture of cellulose pulp and mercerizing agent, i.e., most or all of the mercerizing agent is removed or neutralized in the mixture. The mercerized cellulose pulp is typically washed and/or neutralized. The mercerized pulp may be washed with, for example, water, a weak acid (e.g. having a pH of from about 4.0 to about 6.9), a solution having a weak mercerizing agent (e.g. having a pH of from about 7.1 to about 10.0), or any combination of any of the foregoing.

The mercerizing agent may also be neutralized by applying a neutralizing agent to the cellulose pulp. Suitable neutralizing agents include, but are not limited to, sulfuric acid, hydrochloric acid, oxalic acid, sulfur dioxide, phosphoric acid, and any combination of any of the foregoing. The cellulose pulp may be washed and neutralized in any order. Typically, the pulp is neutralized to a pH of from about 6.0 to about 8.0. After the cellulose pulp is neutralized, it is preferably washed to remove excess salts, such as sodium chloride (NaCl). The mercerizing agent may be recovered during the washing and/or neutralizing steps and recycled for later use.

According to a preferred embodiment, the mercerized cellulose pulp is washed with water. The mercerized cellulose pulp is generally washed with water until the residual water from the pulp has a pH of less than about 10.0 and preferably a pH of from about 5.0 to about 8.0.

The washed and/or neutralized cellulose pulp generally contains less than about 3.5% by weight of mercerizing agent, based upon 100% weight of cellulose pulp and mercerizing agent. The washed and/or neutralized cellulose pulp preferably contains less than about 0.3%, more preferably less than about 0.03%, and most preferably less than about 0.02% by weight of mercerizing agent, based upon 100% weight of cellulose pulp and mercerizing agent.

The cellulose pulp may be dried after the mercerization and washing and/or neutralizing steps to produce sheet, bale, or bulk cellulose pulp. Drying may be performed by any method known in the art. Preferably, the cellulose pulp is dried until the cellulose pulp contains less than about 20%, more preferably less than about 15%, and most preferably less than about 10% by weight of moisture content, based upon 100% weight of total cellulose pulp and water. Drying is typically performed at a temperature of from about 100 to about 185° C. and preferably from about 120 to about 170° C.

Preferably, cellulose pulp such as CLP, NSS, SSK, and SHK, mercerized with alkali metal hydroxide and recovered has an Rx value of greater than about 0.57, more preferably greater than about 0.60, and most preferably greater than about 0.64. The cellulose pulp may also have an Rx value of greater than about 0.575, 0.58, 0.59, 0.61, 0.62, or 0.63. Preferably, the mercerized and recovered cellulose pulp has a total crystallinity of less than about 60% and more preferably less than about 50% by weight of crystalline portion, based upon 100% weight of total cellulose. Mercerzied and recovered wood derived cellulose pulp preferably has a total crystallinity of less than about 45% by weight of crystalline portion, based upon 100% weight of total cellulose.

According to a preferred embodiment, mercerized and recovered CLP has an Rx value of greater than about 0.57 and a total crystallinity of less than about 60% by weight, based upon 100% weight of total cellulose pulp. According to yet another preferred embodiment, mercerized and recovered SHK has an Rx value of greater than about 0.57 and a total crystallinity of less than about 50% by weight, based upon 100% weight of total cellulose pulp. According to yet another preferred embodiment, mercerized and recovered SSK has an Rx value of greater than about 0.57 and a total crystallinity of less than about 50% by weight, based upon 100% weight of total cellulose pulp. According to yet another preferred embodiment, mercerized and recovered NSS has an Rx value of greater than about 0.57 and a total crystallinity of less than about 50% by weight, based upon 100% weight of total cellulose pulp.

The method of the present invention may be applied to mercerized and recovered cellulose pulp of any viscosity. For example, the mercerized and recovered cellulose pulp can have a TAPPI T230 om-89 viscosity of greater than 12 cP or a TAPPI T230 om-89 viscosity of at most 12 cP. According to one embodiment, the mercerized and recovered cellulose pulp has a TAPPI T230 om-89 viscosity of less than 10.4, 9.25, or 8 cP. According to another embodiment, the mercerized and recovered cellulose pulp has a TAPPI T230 om-89 viscosity of greater than 11.2 cP but less than or equal to 12 cP.

The mercerized and recovered cellulose pulp can have a solubility in 10% sodium hydroxide as determined by ASTM D 1696-95 of greater than 2.3%, 3.0%, or 5.0% and/or a solubility in 18% sodium hydroxide as determined by ASTM D 1696-95 of greater than 1.3%, 2.0%, or 4.0%.

The mercerized and recovered cellulose pulp may or may not be prehydrolyzed. Also, the mercerized and recovered cellulose pulp may or may not be bleached with, for example, elemental chlorine.

According to one embodiment, when the cellulose pulp is southern softwood kraft, the mercerized and recovered cellulose pulp has a viscosity of at most 12 cP as measured by TAPPI T230 om-89. According to a preferred embodiment, the mercerized and recovered southern softwood kraft cellulose pulp has at least one of the following properties:

(i) a TAPPI 230 om-89 viscosity of less than 10.4, 9.25, or 8 cP or greater than 11.2 cP,
(ii) a solubility in 10% sodium hydroxide as determined by ASTM D 1696-95 of greater than 2.3%, 3.0%, or 5.0%,
(iii) a solubility in 18% sodium hydroxide as determined by ASTM D 1696-95 of greater than 1.3%, 2.0%, or 4.0%,
(iv) not been prehydrolyzed,
(v) not been bleached with elemental chlorine, or
(vi) any combination of any of the foregoing.

A more preferred embodiment is when the aforementioned mercerized and recovered southern softwood kraft cellulose pulp is used to prepare hydroxyethyl cellulose.

When the cellulose pulp is southern softwood kraft, the mercerized and recovered cellulose pulp typically has a viscosity of at least 12 cP as measured by TAPPI T230 om-89. Preferably, the mercerized southern softwood kraft cellulose pulp has a viscosity of at least 20 and more preferably at least 26 cP as measured by TAPPI T230 om-89.

The mercerized and recovered cellulose pulp is preferably substantially free of cellulose III. The mercerized cellulose pulp preferably contains less than about 20% and more preferably less than about 5% by weight of cellulose III, based upon 100% total weight of the crystalline portion of the cellulose pulp.

Generally, the mercerized and recovered cellulose pulp is substantially free of etherification agents and preferably contains less than about 0.1% by weight of etherification agent, based upon 100% total weight of cellulose pulp and etherification agent. More preferably, the mercerized and recovered cellulose pulp is free of etherification agents.

The mercerized and recovered cellulose pulp may have an alpha cellulose content less than 97%, 95%, 90%, or even 85% as determined by TAPPI Method T203 or ASTM D 588-42. The alpha cellulose content of a cellulose pulp is that part of the pulp that is insoluble in a solution of sodium hydroxide.

The mercerized and recovered cellulose pulp is preferably premanufactured, i.e., prepared at a location remote from where the cellulose ethers are prepared in large quantities. The term "large quantities" is herein defined as a quantity greater than about 20 kg.

Preparation of the Cellulosic Floc

The cellulose pulp may be converted into a cellulose floc before or after mercerizing and recovering the pulp. Preferably, the cellulose pulp is mercerized and recovered before being converted into a cellulose floc.

The cellulose floc may be produced by any method known in the art, such as by mechanical processing. The cellulose pulp may be ground, such as with rotational cutting blades, to the desired floc size. The cellulose pulp may also be ground with a one and/or two stage rotating knife grinder. Alternatively, the pulp may be diced or shredded to form the cellulose floc by methods known in the art.

The fiber lengths of the ground cellulose floc may vary depending on the ether to be produced. The number average floc lengths, i,e., the lengths of fibers in the floc, broadly vary from about 0.1 to about 2.0 mm. A preferred fiber length for ground cellulose floc is from about 0.2 to about 0.5 mm. Diced floc lengths typically range from about 0.5 to about 5.0 mm$^2$ and preferably range from about 1 to about 3 mm$^2$. The dry density of the floc varies primarily according to floc length and the density of the mercerized cellulose pulp.

For instance, CLP derived cellulose floc of the present invention having a number average floc length of 0.25 to 0.50 mm broadly has a floc tap density according to the formula:

$$\text{Floc Tap Density}_{CLP\ Floc} = m^*(AFL)^{-0.8043}$$

where m ranges from 0.0755 to 0.0835 and AFL represents the number average floc length. SSK derived cellulose floc of the present invention having a number average floc length of 0.25 to 0.50 mm broadly has a floc tap density according to the formula:

$$\text{Floc Tap Density}_{SSK\ Floc} = m^*(AFL)^{-0.9676}$$

where m ranges from 0.0841 to 0.0925 and AFL is defined as above. NSS derived cellulose floc of the present invention having a number average floc length of 0.25 to 0.50 mm broadly has a floc tap density according to the formula:

$$\text{Floc Tap Density}_{NSS\ Floc} = m^*(AFL)^{-0.7336}$$

where m ranges from 0.0689 to 0.0758 and AFL is defined as above.

Preparation of Cellulose Ethers

The mercerized cellulose pulp may be converted into cellulose ether by any method known in the art. A preferred method of converting the mercerized cellulose pulp comprises treating the mercerized cellulose pulp to form a cellulose floc and converting the cellulose floc into cellulose ethers. For example, cellulose ethers may be prepared by alkalating the cellulose floc to form an alkali cellulose, and etherifying the alkali cellulose to form a cellulose ether. The cellulose floc may be prepared as described above or by any other method known in the art. The cellulose ethers may also be prepared by alkalating and etherifying the cellulose pulp without forming a cellulose floc.

Alternatively, cellulose floc may be mercerized and recovered as described above and then converted into cellulose ethers. For example, cellulose ethers may be prepared by alkalating the mercerized and recovered cellulose floc to form an alkali cellulose, and etherifying the alkali cellulose.

Alkalating the Mercerized Cellulose Pulp/Floc

The cellulose pulp or floc may be alkalated by any method known in the art. For example, the cellulose pulp or floc may be treated with an alkali metal hydroxide, such as sodium hydroxide, to form the alkali cellulose. Suitable alkali metal hydroxides include, but are not limited to, those described above. The alkali metal hydroxide reacts with the cellulose disrupting the intermolecular hydrogen bonding among the cellulose chains and disrupting the less reactive crystalline regions of the cellulose.

Generally, the mercerized cellulose is treated with an aqueous solution having from about 15 to about 80%, preferably from about 25 to about 65%, and more preferably from about 30 to about 50% by weight of alkali metal hydroxide, based upon 100% total weight of aqueous solution. Alkalation is typically performed at a temperature of from about 20 to about 40° C. and preferably at from about 24 to about 34° C.

According to a preferred environment, the alkalation is performed in an environment substantially free of oxygen, such as under nitrogen. Oxygen can cause disruptions in the polymer chains resulting in a lower viscosity final product.

Etherifying the Alkali Cellulose

The final step is etherifying the alkali cellulose. Typically, the alkali cellulose is etherified by reacting the alkali cellulose with an etherification agent. Suitable etherification agents include, but are not limited to, haloacetic acids and salts thereof, such as sodium-mono-chloro acetate. Various methods for preparing cellulose ethers from alkali cellulose are described in U.S. Pat. Nos. 4,063,018; 4,250,305; and 4,547,570, all of which are herein incorporated by reference.

The conversion of the cellulose floc to alkali cellulose and the etherifying step may be performed simultaneously or sequentially.

Cellulose ethers which may be prepared by the method of the present invention include, but are not limited to, ionic and nonionic cellulose ethers. Examples of such cellulose ethers include, but are not limited to, carboxymethyl cellulose (CMC), hydroxyethyl cellulose (HEC), hydroxypropyl cellulose (HPC), methyl hydroxyethyl cellulose (MHEC), ethyl hydroxyethyl cellulose (EHEC), methyl cellulose (MC), and methyl hydroxy propyl cellulose (MHPC). Cellulose ethers prepared by the method of the present invention are well suited as starting materials for preparing water-soluble polymers.

For instance, this method can prepare cotton linter pulp derived carboxymethyl celluloses (CMC's) having a solution viscosity (according to ASTM D 2196) of from about 60,000 to about 100,000 cP in an aqueous solution consisting of 1% by weight of the CMC; softwood kraft pulp derived CMC having a solution viscosity of from about 1,000 to about 1,600 cP in an aqueous solution consisting of 1% by weight of the CMC; hardwood kraft pulp derived CMC having a solution viscosity of from about 1,000 to about 1,600 cP in an aqueous solution consisting of 1% by weight of the CMC; and wood pulp derived CMC having a solution viscosity of from about 1,800 to about 3000 cP in an aqueous solution consisting of 1% by weight of the CMC. Preferred cotton linter pulp derived CMC's include, but are not limited to, those having a solution viscosity (according to ASTM D 2196) of from about 70,000 to about 85,000 cP in an aqueous solution consisting of 1% by weight of the CMC. Preferred softwood kraft pulp derived CMC's include, but are not limited to, those having a solution viscosity of from about 1,100 to about 1,400 cP in an aqueous solution consisting of 1% by weight of the CMC. Preferred hardwood kraft pulp derived CMC's include, but are not limited to, those having a solution viscosity of from about 1,200 to about 1,400 cP in an aqueous solution consisting of 1% by weight of the CMC. Preferred wood pulp derived CMC's include, but are not limited to, those having a solution viscosity of from about 2,000 to about 2,600 cP in an aqueous solution consisting of 1% by weight of the CMC. These solution viscosities are determined with a Standard Brookfield Viscometer Model LVDV2+ according to ASTM D 2196. Spindle sizes (2–4) are selected as appropriate to ensure a rotational torque greater than 10 and less than 90. The spindle speed is set at 60 rpm. For high viscosity CMC's, such as those prepared from mercerized CLP, a spindle size of four and an rpm setting of 6 may be needed to measure the viscosity of 1% aqueous solutions.

Cellulose ethers prepared by the method of the present invention may be used to make, for example, water-soluble polymers, synthetic thickeners, petroleum production fluids, moisture retention aids, bonding agents (e.g. in lacquers and other paints), adhesives, printing pastes, suspension stabilizing agents, thermoplastic materials, protective colloids, emulsion stabilizers, film-forming agents, finishing compositions (e.g. in textiles), coating compositions (e.g. in paper and paper products), and plastic sheets (i.e. in packaging or textiles).

The following examples illustrate the invention without limitation. All parts and percentages are given by weight unless otherwise indicated. The term "(w/w)" is defined as the weight of one or more specified ingredients in a mixture, based upon 100% total weight of the mixture.

EXAMPLE 1

Preparation of Cotton Linter Pulp Derived Cellulose Floc

Samples of never-dried cotton linter pulp were treated (at 3% consistency for 15 minutes) with 7% (w/w) sodium hydroxide (NaOH) at 75 g/L, 10% (w/w) sodium hydroxide at 111 g/L, 14% (w/w) sodium hydroxide at 162 g/L, and 18% (w/w) sodium hydroxide at 216 g/L, at 25° C. Each pulp sample was bleached with hypochlorite for 50 minutes at 50° C. The pulp was then washed and treated with sulfuric acid and oxalic acid at a 3.5% consistency and formed into sheets with a Formette Dynamique hand sheet former available from Cybermetrics of Alpharetta, Ga. The sheets were dried and ground with a Wiley Mill grinder, available from Arthur H. Thomas Co. of Philadelphia, Pa., to form a cellulose floc having a number average floc length (AFL) of 0.45 mm. The number average fiber length of the floc was determined using a Kajaani FS-200 fiber analyzer available from Neles/Valmet of Kajaani, Finland.

Pulp and floc viscosities were determined according to TAPPI T230 om-89.

Dry floc tap density was determined according to ASTM D 1439 with a 250 ml graduated cylinder which was filled with floc and tapped 1000 times to simulate packing into a reactor.

Water retention values (WRV) were determined for the ground floc according to the procedure described in "The Determination of Water Retention Capacity (Swelling Value) of Pulps", Theodor Hopner, Grorg Jayme and Johannes C. Ulrich, Das Papier, Vol 9, No. 19/20, pp. 476–482 (1955). In general, subdivided pulp samples were swollen in water for 16 to 24 hours and then centrifuged at 1500 g. The moist, centrifuged samples were then weighed, dried at 105±2° C. and re-weighed. The water retained in the samples after centrifugation was primarily retained due to swelling. WRV is defined according to the following formula:

$$WRV = \frac{(\text{Weight of wet centrifuged sample} - \text{weight of dry sample}) \times 100\%}{\text{Weight of dry sample}}$$

The percentage of cellulose II (by weight, based upon 100% weight of the total crystalline portion) and the degree of crystallinity (crystallinity Xc) (by weight, based upon 100% weight of total cellulose) of the cellulose pulp sheet were determined by wide-angle X-ray scattering (WAXS) at the Fraunhofer-Institute of Applied Polymer Research, Teltow-Seehof, Germany (Fink, H.-P., Walenta, E. (1994) Röntgenbeugungsuntersuchungen zur übermolekulararen Struktur von Cellulose im Verarbeitungsprozeβ. Das Papier 12, 739–748; H.-P Fink, D. Hofmann, and B. Philipp, Cellulose 2 (1995), 51–70). Investigations were performed using a Siemens D-500 diffractometer in symmetrical transmission geometry with a Ge primary beam monochromator (isotropic samples $4° \leq 2\theta \leq 104°$).

The Rx value for the sheet pulp was determined as follows. X-ray diffraction (Philips PW 1729 X-Ray Generator with a PW 1840 Diffractometer) was performed on the sheet pulp to determine peak intensities for native Cellulose I and mercerized Cellulose II fibers. The Rx value is the ratio of the peak diffraction for Cellulose II over the sum of the peak diffraction for Cellulose II and Cellulose I. See Rasch and McCarthy, Norsk Skogindustri, 8:329, 1954. The percent Cellulose II increases as the Rx value increases. The Rx value is derived from the intensities (I, counts per second) of the diffracted radiation at approximately 12.6 and 15.6 degrees and is calculated according to the formula $Rx = 2I_{12.6}/2I_{12.6} + I_{15.6}$.

The results are shown in Table 1A below.

TABLE 1A

Mercerization Effects on the Properties of CLP-derived Sheets and Floc

| Mercerizing Agent Treatment Level (NaOH (w/w)) | Control (0%) | 7% | 10% | 14% | 18% |
|---|---|---|---|---|---|
| Sheet Viscosity (cP) | 277 | 267 | 262 | 218 | 224 |
| Floc Viscosity (cP) | 202 | 206 | 198 | 172 | 166 |
| Average Floc Length (mm) | 0.45 | 0.45 | 0.44 | 0.45 | 0.45 |
| Floc Density (g/mL) | 0.108 | 0.112 | 0.116 | 0.147 | 0.152 |
| Floc WRVs (%) | 56.5 | 54.5 | 55.2 | 65.6 | 65.9 |
| Sheet Rx Value | 0.5406 | 0.5370 | 0.5408 | 0.6341 | 0.6540 |
| Sheet Cellulose II (%) | 0 | 0 | 0 | 38 | 62 |
| Sheet Crystallinity Xc (%) | 61 | 60 | 61 | 52 | 46 |

Increasing the concentration of the sodium hydroxide used in the mercerizing agent treatment decreased the viscosity of the cotton linter pulp (CLP). The floc density, however, increased as the mercerizing agent treatment level was increased. The 18% sodium hydroxide treatment resulted in a 41% increase in CLP floc density over the control.

Preparation of Cotton Linter Pulp Derived CMC

The floc was converted into carboxymethyl cellulose (CMC) using an IKA reactor available from Janke and Kunkel of Staufen, Germany, as follows. 40–50 grams of (bone dry) cellulose floc was soaked overnight in water. The soaked cellulose was then added to 776–870 g of aqueous isopropanol (99.0%). The resulting slurry was stirred for 30 minutes at approximately 25° C. 46–58 grams of 50% (w/w) aqueous sodium hydroxide was added to the slurry to alkalize the cellulose floc. Alkalization was carried out at approximately 25° C. for 30 minutes. 26–35 g of 99.6% monochloroacetic acid was dissolved in 100 g of isopropanol and added to the slurry. The slurry was then heated to 75° C. for 1.5 hours, after which the reaction was stopped and the slurry was drained using a 15 cm Buchner funnel with #4 filter paper. The filtrate was washed four times with methanol to remove the sodium chloride and other by-products. The remaining CMC was then forced air dried at about 55° C. and evaluated using standard procedures and methods (i.e. ASTM methodology) as described below. Two separate batches of CMC were prepared and tested at each mercerizing agent concentration, except for 7% and 10%. Only one batch of CMC was prepared and tested at each of the 7% and 10% mercerizing agent concentrations.

Ether rotational viscosity was measured for a range of aqueous solutions (0.5% –1%) with a Standard Brookfield Viscometer Model LVDV2+ according to ASTM D 2196. Spindle sizes (2–4) were selected as appropriate to ensure a rotational torque greater than 10 and less than 90. The spindle speed was set at 60 rpm, except as where noted otherwise in Table 1B. For high viscosity CMC's prepared from mercerized CLP, a spindle size of four and an rpm setting of 6 was needed to measure the viscosity of 1% aqueous solutions.

The degree of substitution (DS) of the CMC was determined by titration with 0.1N hydrochloric acid of ashed CMC samples (0.2–1.0 g). The ashed CMC samples were prepared by heating the CMC at about 600° C. for about 20 minutes. CMC DS values ranged from about 0.7 to about 0.85.

The results are shown in Table 1B below.

TABLE 1B

Mercerization Effects on the Properties of CLP-derived CMC

| Mercerizing Agent Treatment Level (NaOH (w/w)) | CMC 0.50% Viscosity (cP) | CMC 0.75% Viscosity (cP) | CMC 1% Viscosity (cP)** | CMC Degree of Substitution (DS) |
|---|---|---|---|---|
| Control (0%) | 754 | 2751 | 34690 | 0.825 |
| 7% | 825 | 2538 | 40600 | 0.765 |
| 10% | 742 | 2373 | 35450 | 0.846 |
| 14% | 1678 | 4889 | 80095 | 0.729 |
| 18% | 1713 | 6387 | 83745 | 0.794 |

**1% solution viscosities were measured with a # 4 Spindle at a spindle speed of 6 rpm.

The degree of substitution (DS) for the CMC solutions was not improved with the addition of a mercerizing agent treatment stage. However, there was a large improvement in CMC solution viscosity (78% for 14% (w/w) sodium hydroxide and 132% for 18% (w/w) sodium hydroxide, in a 0.75% CMC solution) associated with the sodium hydroxide treatments.

EXAMPLE 2

Preparation of Southern Softwood Kraft (SSK) Derived Cellulose Floc and CMC

Non-mercerized SSK sheets (grade E30) available from Buckeye Technologies of Foley, Fla., were disintegrated according to the procedure described in TAPPI TMI 73-06-00 with a counter setting of 600 to form a pulp slurry. The slurry was then treated (at 3% consistency for 15 minutes) with 7% (w/w) sodium hydroxide (NaOH) at 75 g/L, 10% (w/w) sodium hydroxide at 111 g/L, 14% (w/w) sodium hydroxide at 162 g/L, and 18% (w/w) sodium hydroxide at 216 g/L at 25° C. The pulp was then washed to remove the sodium hydroxide and formed into sheets with a Formette Dynamique hand sheet former. The sheets were dried and ground with a Wiley Mill grinder to form floc having a number average floc length of 0.39–0.49 mm.

The cellulose floc was converted into CMC according to the procedure in Example 1. Two samples of CMC from the cellulose floc were prepared and tested.

A control cellulose floc was prepared from the same cellulose pulp but without mercerizing it with sodium hydroxide. CMC was also prepared from the control cellulose floc according to the procedure described in Example 1.

The results are shown in Table 2 below.

TABLE 2

Mercerization Effects on the Properties of SSK-derived Sheets, Floc and CMC

| Mercerizing Agent Treatment Level (NaOH (w/w)) | Control (0%) | 7% | 10% | 14% | 18% |
|---|---|---|---|---|---|
| Sheet Viscosity (cP) | 28.8 | 31.9 | 30.7 | 27.8 | 27.4 |
| Floc Viscosity (cP) | 23.8 | 27.8 | 26.7 | 23.7 | 23.7 |
| Average Floc Length (mm) | 0.45 | 0.39 | 0.41 | 0.46 | 0.47 |
| Floc Density (g/mL) | 0.149 | 0.166 | 0.187 | 0.180 | 0.194 |
| Floc WRVs (%) | 71.4 | 70.4 | 73.9 | 74.0 | 78.9 |
| Sheet Rx Value | 0.5505 | 0.5557 | 0.5925 | 0.6422 | 0.6516 |
| Sheet Cellulose II (%) | 0 | 0 | 24 | 61 | 72 |
| Sheet Crystallinity Xc (%) | 52 | 54 | 44 | 40 | 39 |
| CMC 0.50% Viscosity (cP) | 73 | 70 | 87 | 125 | 121 |
| CMC 1% Viscosity (cP) | 586 | 483 | 607 | 1268 | 1147 |
| CMC DS | 0.820 | 0.766 | 0.793 | 0.826 | 0.781 |

The floc mercerized with 18% (w/w) sodium hydroxide had an increase in dry tap density of 30% and an 11% increase in WRV relative to the control. The increase in viscosity (for a 1.0% CMC solution) for the 14% and 18% mercerization treatment varied from 96% to 128%. This increase in solution viscosity for mercerized SSK pulp substantially expands the solution viscosity range for ethers made from SSK.

For the control and 18% (w/w) mercerization treateament, the degree of polymerization (weight average) (DPw) for the cellulose floc and CMC was determined as follows. The DPw for the cellulose floc was predicted from the 0.5% CED viscosity according to the method described by Morton, J. H., in *The Chemistry and Processing of Wood and Plant Fibrous Materials*, Kennedy, J. F., Phillips, G. O., Williams, P. A. eds. Chapter 15, Woodhead Publishing Ltd., Cambridge, Eng. 1996.

The DPw for CMC was determined from intrinsic viscosity values using cadoxen as the solvent according to the procedure described in W. Brown, D. Henley and J. Oehman, *Makromol Chem.*, 62:164 (1963).

The results are shown in Table 3 below.

TABLE 3

CMC DPw Changes with Caustic Treatment of an SSK

| Treatment (w/w NaOH) | Cellulose Floc Viscosity (cP) | Cellulose Floc DPw | CMC DPw | Etherification Changes in DPw (%) |
|---|---|---|---|---|
| Control (0% NaOH) | 23.8 | 2633 | 2270 | −14 |
| 18% NaOH | 23.7 | 2628 | 2605 | −1 |

The control pulp exhibited a 14% reduction in DPw during etherification while the mercerized floc exhibited only a 1% DPw reduction.

EXAMPLE 3

Preparation of Southern Softwood Kraft (SSK) Derived Cellulose Floc and CMC

Never dried in-process SSK pulp produced by Buckeye Technologies of Foley, Fla., was collected after the chlorine dioxide, alkali treatment, chloride dioxide bleaching stages (DED) for additional lab scale bleaching. The pulp slurry was then treated (at 3% consistency for 15 minutes) with 7% (w/w) sodium hydroxide at 75 g/L, 10% (w/w) sodium hydroxide at 111 g/L, 14% (w/w) sodium hydroxide at 162 g/L, and 18% (w/w) sodium hydroxide at 216 g/L at 25° C. The pulp was washed to remove the sodium hydroxide, treated with chlorine dioxide, and then treated with sulfuric acid. The resulting slurry was washed with soft water until the residual water had a pH below 9 and formed into sheets with a Formette Dynamique hand sheet former. The dried hand sheets were ground with a Wiley Mill grinder to form floc having an average floc length (AFL) of 0.36–0.37 mm.

The floc was converted into CMC according to the procedure described in Example 1. Two batches of CMC were separately prepared and tested from each batch of treated cellulose pulp.

A control was prepared from the same material without mercerizing the pulp with sodium hydroxide.

The results are shown in Table 4 below.

TABLE 4

Mercerization Effects on the Properties of Never Dried (ND) SSK-derived Sheets, Floc and CMC

| Mercerizing Agent Treatment Level (NaOH (w/w)) | Control (0%) | 7% | 10% | 14% | 18% |
|---|---|---|---|---|---|
| Sheet Viscosity (cP) | 28.7 | 32.4 | 26.0 | 24.3 | 24.8 |
| Floc Viscosity (cP) | 25.1 | 27.9 | 22.7 | 22.0 | 21.4 |
| Average Floc Length (mm) | 0.37 | 0.37 | 0.37 | 0.37 | 0.36 |
| Floc Density (g/mL) | 0.205 | 0.179 | 0.224 | 0.242 | 0.233 |
| Floc WRVs (%) | 70.8 | 65.6 | 69.6 | 71.7 | 71.0 |
| Sheet Rx Value | 0.5439 | 0.5529 | 0.6085 | 0.6534 | 0.6659 |
| Sheet Cellulose II (%) | 0 | 0 | 39 | 69 | 74 |
| Sheet Crystallinity Xc (%) | 52 | 52 | 41 | 39 | 37 |

TABLE 4-continued

Mercerization Effects on the Properties of Never Dried (ND) SSK-derived Sheets, Floc and CMC

| Mercerizing Agent Treatment Level (NaOH (w/w)) | Control (0%) | 7% | 10% | 14% | 18% |
|---|---|---|---|---|---|
| CMC 0.50% Viscosity (cP) | 78 | 106 | 156 | 166 | 131 |
| CMC 1% Viscosity (cP) | 550 | 679 | 1108 | 1365 | 1472 |
| CMC DS | 0.869 | 0.831 | 0.806 | 0.802 | 0.820 |

The increase in viscosity in the 1.0% CMC aqueous solution for the 14% and 18% mercerization levels varied from 148% to 168% relative to the control. The floc mercerized with 18% (w/w) sodium hydroxide had a dry tap density 14% greater than that of the control.

EXAMPLE 4

Preparation of NSS Derived Cellulose Floc and CMC

Non-mercerized northern softwood sulfite (NSS) pulp sheets were disintegrated according to the procedure described in TAPPI TMI 73-06-00 with a counter setting of 600 to form a pulp slurry. The slurry was then treated (at 3% consistency for 15 minutes) with 7% (w/w) sodium hydroxide at 75 g/L, 10% (w/w) sodium hydroxide at 111 g/L, 14% (w/w) sodium hydroxide at 162 g/L, and 18% (w/w) sodium hydroxide at 216 g/L at 25° C. The pulp was then washed with water and treated with sulfuric acid and oxalic acid at a 3.5% consistency. The pulp was formed into sheets with a Formette Dynamique hand sheet former, dried, and ground with a Wiley Mill grinder to form cellulose floc having an average floc length of 0.28–0.29 mm. The floc was converted into CMC according to the procedure described in Example 1. Two separate batches of CMC were prepared from each batch of treated cellulose pulp and tested.

A first control(control 1) was prepared by directly grinding non-mercerized NSS sheets into floc and converting the floc into CMC as described in Example 1.

A second control (control 2) was prepared by disintegrating non-mercerized NSS sheets according to the procedure described in TAPPI TMI 73-06-00 with a counter setting of 600 to form a pulp slurry. The disintegrated pulp was formed into sheets with a Formette Dynamique hand sheet former, dried, and ground with a Wiley Mill grinder to form cellulose floc. This floc was converted into CMC as described in Example 1.

The results are shown in Table 5 below.

TABLE 5

Mercerization Effects on the Properties of NSS-derived Sheets Floc and CMC

| Mercerizing Agent Treatment Level (NaOH (w/w)) | Control 1 | Control 2 | 7% | 10% | 14% | 18% |
|---|---|---|---|---|---|---|
| Sheet Viscosity (cP) | 67.2 | 60.0 | 64.8 | 63.6 | 65.4 | 61.9 |
| Floc Viscosity (cP) | 47.4 | 56.1 | 51.0 | 53.7 | 52.5 | 49.8 |

TABLE 5-continued

Mercerization Effects on the Properties of NSS-derived Sheets Floc and CMC

| Mercerizing Agent Treatment Level (NaOH (w/w)) | Control 1 | Control 2 | 7% | 10% | 14% | 18% |
|---|---|---|---|---|---|---|
| Average Floc Length (mm) | 0.29 | 0.27 | 0.28 | 0.28 | 0.27 | 0.29 |
| Floc Density (g/mL) | 0.135 | 0.144 | 0.143 | 0.177 | 0.176 | 0.173 |
| Floc WRVs (%) | 74.7 | 70.2 | 68.1 | 73.0 | 75.8 | 73.1 |
| Sheet Rx Value | 0.5615 | 0.5365 | 0.5553 | 0.6129 | 0.6443 | 0.6438 |
| Sheet Cellulose II (%) | — | 0 | 0 | 40 | 61 | 65 |
| Sheet Crystallinity Xc (%) | — | 50 | 54 | 44 | 42 | 41 |
| CMC 0.50% Viscosity (cP) | 114 | 111 | 118 | 265 | 233 | 304 |
| CMC 1% Viscosity (cP) | 898 | 1087 | 853 | 2037 | 1835 | 2608 |
| CMC DS | 0.793 | 0.828 | 0.822 | 0.791 | 0.779 | 0.759 |

The mercerized floc at 10, 14 and 18% (w/w) sodium hydroxide all had comparable increases (31 to 28%) in dry tap density over the control. The viscosities (for a 1.0% CMC solution) of the CMC's prepared with 10, 14 and 18% (w/w) treatments were 104 to 190% greater than that of the control. CMC solution viscosities in this range exceed what is currently commercially available for CMC made from wood pulp. This increase in solution viscosity for mercerized NSS pulp substantially expands the solution viscosity range for ethers made from NSS.

EXAMPLE 5

Preparation of SHK Derived Cellulose Floc and CMC

Non-mercerized southern hardwood kraft (SHK) pulp sheets were disintegrated according to the procedure described in TAPPI TMI 73-06-00 with a counter setting of 600 to form a pulp slurry. The slurry was then treated (at 3% consistency for 15 minutes) with 7% (w/w) sodium hydroxide at 75 g/L, 10% (w/w) sodium hydroxide at 111 g/L, 14% (w/w) sodium hydroxide at 162 g/L, and 18% (w/w) sodium hydroxide at 216 g/L at 25° C. The pulp was then washed and treated with sulfuric acid and oxalic acid at a 3.5% consistency. The pulp was formed into sheets with a Formette Dynamique hand sheet former, dried, and ground with a Wiley Mill grinder to form cellulose floc having an average floc length of 0.22–0.25 mm. The floc was converted into CMC according to the procedure described in Example 1. Two separate batches of CMC were prepared from each batch of treated cellulose pulp and tested.

A first control (control 1) was prepared by directly grinding non-mercerized SHK sheets into floc and converting the floc into CMC as described in Example 1.

A second control (control 2) was prepared by disintegrating non-mercerized SHK sheets according to the procedure described in TAPPI TMI 73-06-00 with a counter setting of 600 to form a pulp slurry. The disintegrated pulp was formed into sheets with a Formette Dynamique hand sheet former, dried, and ground with a Wiley Mill grinder to form cellulose floc. This floc was converted into CMC as described in Example 1.

The results are shown in Table 6 below.

TABLE 6

Mercerization Effects on the Properties of SHK-derived Sheets, Floc and CMC

| Mercerizing Agent Treatment Level (NaOH (w/w)) | Control 1 | Control 2 | 7% | 10% | 14% | 18% |
|---|---|---|---|---|---|---|
| Sheet Viscosity (cP) | 12.3 | 11.9 | 11.6 | 11.7 | 11.3 | 11.1 |
| Floc Viscosity (cP) | 11.5 | 11.0 | 10.7 | 10.9 | 10.6 | 10.4 |
| Average Floc Length (mm) | 0.22 | 0.24 | 0.24 | 0.24 | 0.25 | 0.23 |
| Floc Density (g/mL) | 0.135 | 0.120 | 0.125 | 0.140 | 0.138 | 0.132 |
| Floc WRVs (%) | 76.2 | 69.5 | 71.9 | 70.9 | 71.1 | 72.4 |
| Sheet Rx Value | 0.5629 | 0.5466 | 0.5699 | 0.5717 | 0.6290 | 0.6537 |
| Sheet Cellulose II (%) | — | 0 | 1 | 5 | 62 | 65 |
| Sheet Crystallinity Xc (%) | — | 53 | 52 | 49 | 37 | 39 |
| CMC 0.50% Viscosity (cP) | 49 | 65 | 48 | 71 | 148 | 143 |
| CMC 1% Viscosity (cP) | 230 | 362 | 251 | 461 | 547 | 923 |
| CMC DS | 0.805 | 0.728 | 0.790 | 0.701 | 0.634 | 0.659 |

The mercerized cellulose pulp exhibited viscosity increases for the 1.0% CMC solution ranging from 100% at the 10% sodium hydroxide level to 300% at the 18% sodium hydroxide level.

EXAMPLE 6

The dry floc densities of the floc prepared from mercerized and non-mercerized cotton linters pulp, southern softwood kraft, and northern softwood sulfite in Examples 1, 2, and 4, respectively, are plotted against the average fiber length of the floc in FIG. 1.

Figure 2:
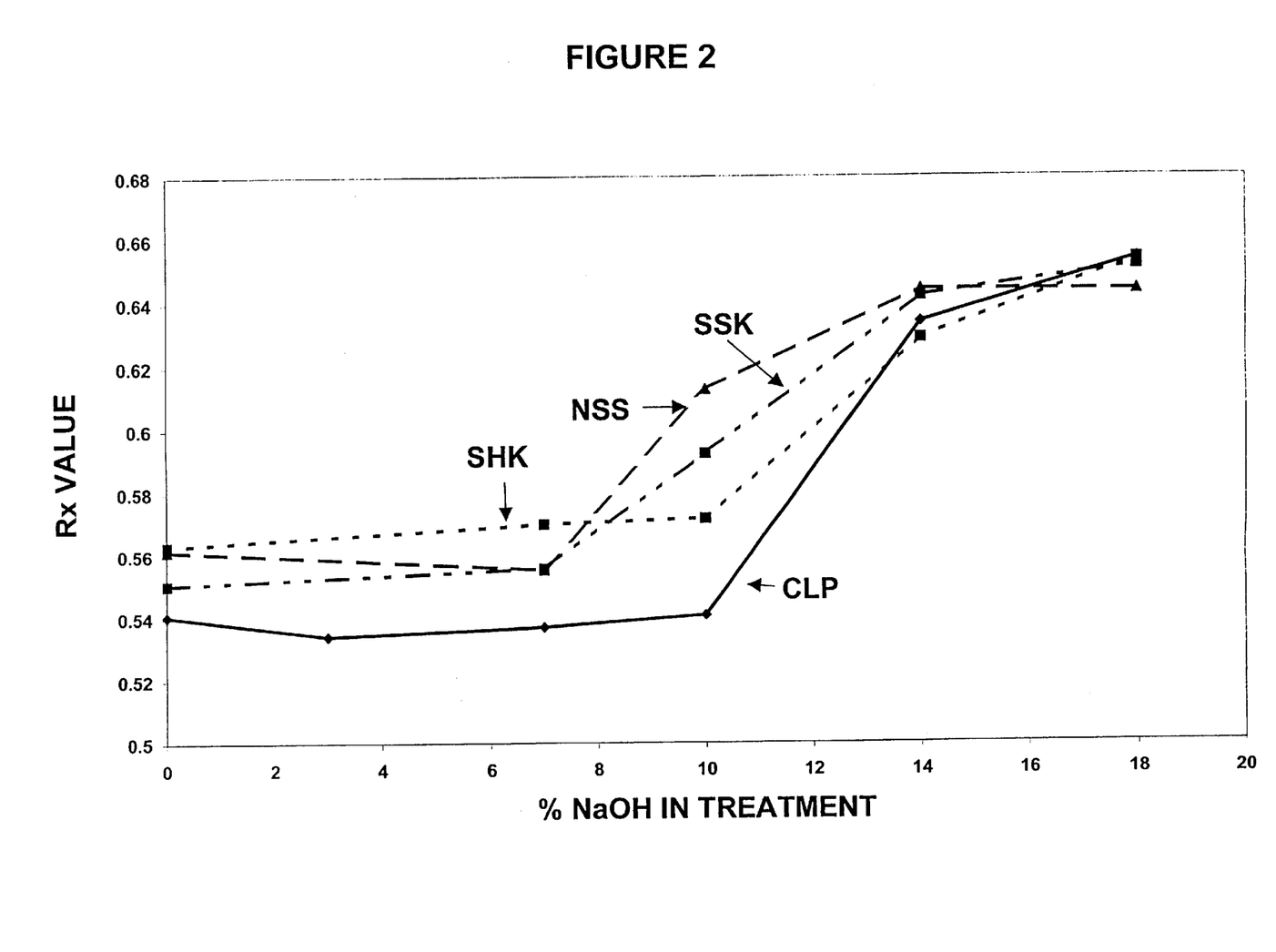
FIG. 2 is a line graph of the Rx value of mercerized cotton linters pulp, southern softwood kraft pulp, northern softwood sulfite pulp, and southern hardwood kraft pulp versus the percentage of sodium hydroxide applied during treatment of the pulp.

The Rx values of mercerized cotton linters pulp, southern softwood kraft pulp, northern softwood sulfite pulp, and southern hardwood kraft pulp prepared in Examples 1, 2, 4, and 5, respectively, are plotted against the percentage of sodium hydroxide applied during treatment of the pulp in FIG. 2.

EXAMPLE 7

Preparation of CMC from Never Dried (Wet) CLP

Never dried in process CLP (UVE grade) produced by Buckeye Technologies cellulose mill in Memphis, Tenn., was collected after digesting and bleaching for lab scale mercerization. The never dried pulp was treated (at 3% consistency for 15 minutes) with an aqueous solution of 18% (w/w) sodium hydroxide (216 g/l). The treatment temperature was about 25° C. The pulp was then washed and treated with sulfuric acid at a 3.5% consistency. The pulp was formed into sheets using a Formette Dynamique hand sheet former, dried, and ground with a Wiley Mill grinder to form floc having an average floc length of 0.39 to 0.40 mm. The floc was converted into CMC according to the procedure described in Example 1.

Preparation of CMC from Re-wetted Dried Finished Product CLP

A sample of dried finished product CLP from the same production run was disintegrated according to TAPPI TMI 73-06-00 (with a counter setting of 600) to form a pulp slurry. The slurry was mercerized, washed, treated with acid, formed into sheets, ground into floc, and converted into CMC as described above.

Preparation of Dried Finished Product CLP (Control)

For a control, a sample of dried finish product CLP from the same production run was collected and ground into floc and converted into cellulose ethers as described above.

Three samples of CMC were prepared by each procedure above and tested. The results are shown in Table 7 below.

The never-dried mercerized CLP provided 1% aqueous CMC solution viscosities that were 269 percent higher than the control. The 1% aqueous CMC solution viscosities for the previously dried and then mercerized treatment were 102 percent higher than the control.

EXAMPLE 8

Preparation of Methyl Cellulose (MC) from Finished Product CLP

Finished product CLP (HVE grade) produced by Buckeye Technologies cellulose mill in Memphis, Tenn., was collected for treatment and were disintegrated according to TAPPI TMI 73-06-00 with a counter setting of 600 to form a pulp slurry. The slurry was then treated (at 3% consistency for 15 minutes) with 14% (w/w) sodium hydroxide at 162 g/L, 18% (w/w) sodium hydroxide at 216 g/L, and 24% (w/w) sodium hydroxide at 304 g/L at 25 ° C. The pulp was then washed and treated with sulfuric acid and oxalic acid at a 3.5% consistency. The pulp was formed into sheets with a Formette Dynamique hand sheet former, dried, and ground using a Wiley Mill grinder to form floc having an average floc length of 0.29 to 0.31 mm.

The floe was converted into MC using a Drais high consistency reactor, which is available from Draiswerke GmbH of Mannheim, Germany, as follows. 150 grams of (bone dry) purified cellulose floe (under a nitrogen blanket) was sprayed with 296 g of 50% (w/w) sodium hydroxide and stirred for 5 minutes at about 25° C. Then 374 g of methylchloride ($CH_3Cl$) was added to the alkali cellulose. The resulting mixture was heated to about 75° C. and the reaction run for 2.5 hours. The resulting product was removed from the reactor and washed four times in 80° C. water. The remaining MC was then forced air dried at 105° C.

The degree of substitution (DS) for the MC was determined using ASTM method D 3876-96 with a Hewlett Packard gas chromatography model 5890, series 2, with the following column: Hewlett Packard HP-20M Carbowax 20M; 30M×0.53 mm×1.33 microns film thickness.

TABLE 7

| Starting Cellulose | Mercerizing Agent Treatment Level (NaOH (w/w)) | Sample | Sheet Viscosity (cP) | Floc Viscosity (cP) | Average Floc Length (mm) | CMC 0.50% Viscosity (cP) | CMC 0.75% Viscosity (cP) | CMC 1.00% Viscosity (cP) | CMC DS |
|---|---|---|---|---|---|---|---|---|---|
| Never Dried Wet Pulp | 18% | A | 227 | 188 | 0.39 | 1455 | 4695 | 76910 | 0.829 |
|  | 18% | B | 227 | 188 | 0.39 | 1599 | 4856 | 80000 | 0.795 |
|  | 18% | C | 227 | 188 | 0.39 | 1658 | 5580 | 81320 | 0.800 |
|  | — | Average | 227 | 188 | 0.39 | 1571 | 5044 | 79410 | 0.808 |
| Re-wetted Dried CLP | 18% | A | 242 | 177 | 0.40 | 603 | 1891 | 29160 | 0.709 |
|  | 18% | B | 242 | 177 | 0.40 | 708 | 2345 | 24010 | 0.772 |
|  | 18% | C | 242 | 177 | 0.40 | 1502 | 4436 | 77190 | 0.804 |
|  | — | Average | 242 | 177 | 0.40 | 937 | 2891 | 43453 | 0.745 |
| Control | 0% | A | 289 | 214 | 0.39 | 681 | 1992 | 19580 | 0.859 |
|  | 0% | B | 289 | 214 | 0.39 | 746 | 2130 | 21370 | 0.755 |
|  | 0% | C | 289 | 214 | 0.39 | 708 | 2461 | 23530 | 0.822 |
|  | — | Average | 289 | 214 | 0.39 | 712 | 2194 | 21493 | 0.812 |

The ether rotational viscosity was measured with a standard Brookfield Viscometer Model LVDV2+ as follows. The MC was dissolved and stirred in hot water (80–90° C.) for 30 minutes. The solution was then stirred and cooled to 5° C. The temperature of the solution was adjusted in a water bath to 20° C. for the viscosity measurement.

Additional floc and ether characteristics were determined by the methods described in Example 1.

Two separate batches of MC were prepared from each batch of treated cellulose pulp and tested.

A control MC was prepared by the same process, except the pulp was not treated with sodium hydroxide and washed.

The results are shown in Table 8 below.

TABLE 8

Mercerization Effects on the
Properties of CLP-derived Sheets, Floc and MC

| Mercerizing Agent Treatment Level (NaOH (w/w)) | Control | 14% | 18% | 24% |
|---|---|---|---|---|
| Sheet Viscosity (cP) | 307 | 223 | 211 | 218 |
| Floc Viscosity (cP) | 182 | 160 | 158 | 179 |
| Average Floc Length (mm) | 0.31 | 0.30 | 0.31 | 0.29 |
| Floc Density (g/mL) | 0.151 | 0.202 | 0.206 | 0.195 |
| Floc WRVs (%) | 57 | 67 | 67 | 62 |
| MC 1% Viscosity (cP) | 16347 | 176 | 86 | 76 |
| CMC DS | 2.02 | 1.92 | 1.85 | 1.65 |

The mercerized treatment results in an increase in floc density and floc WRV. The viscosity and degree of substitution of methyl cellulose prepared from mercerized CLP decreased as the concentration of sodium hydroxide increased.

EXAMPLE 9

Preparation of CLP Derived Cellulose Floc and CMC

Never dried in process CLP (UVE grade) produced by Buckeye Technologies cellulose mill in Memphis, Tenn., was collected after digesting and bleaching and treated (at 3% consistency for 15 minutes) with 18% (w/w) sodium hydroxide at 216 g/L at 25° C. The pulp was then washed and treated with sulfuric acid at a 3.5% consistency. The pulp was formed into sheets with a Formette Dynamique hand sheet former, dried, and ground using a Wiley Mill grinder to form floc having an average floc length of 0.40 to 0.41 mm.

The floc was converted into CMC using a Drais high consistency reactor, which is available from Draiswerke GmbH of Mannheim, Germany, as follows. 150 grams of (bone dry) purified cellulose floc (under a nitrogen blanket) was sprayed with 175 g of 50% (w/w) sodium hydroxide and stirred for 60 minutes at about 25–30° C. to form an alkali cellulose. Then 102 g of 99% (w/w) monochloroacetic acid (MCA) dissolved in isopropanol heated at 50° C. was added to the alkali cellulose. The resulting mixture was placed under a nitrogen blanket and heated to about 70° C. The reaction was run for 3.0 hours at 70° C. After the reaction was stopped, the mixture was drained with a 15 cm Büchner funnel with #4 filter paper. The sodium chloride and remaining by-products were removed by washing the mixture twice with aqueous methanol and twice with methanol. The remaining CMC was then forced air dried at 55° C.

Two separate batches of CMC were prepared from each batch of treated cellulose pulp and tested.

For a control, a sample of finished product CLP (HVE grade) produced by Buckeye Technologies cellulose mill in Memphis, Tenn. was directly ground into floc and converted into CMC.

The results are shown in Table 9 below.

TABLE 9

Mercerization Effects on the Properties
of CLP-derived Sheets, Floc and CMC

| Mercerizing Agent Treatment Level (NaOH (w/w)) | Control | 18% |
|---|---|---|
| Sheet Viscosity (cP) | 330 | 222 |
| Floc Viscosity (cP) | 208 | 171 |
| Average Floc Length (mm) | 0.41 | 0.40 |
| Floc Density (g/mL) | 0.1025 | 0.1370 |
| CMC 0.50% Viscosity (cP) | 1422 | 2072 |
| CMC 0.75% Viscosity (cP) | 3125 | 5581 |
| CMC 1.00% Viscosity (cP) | 30145 | 75190 |
| CMC DS | 0.767 | 0.797 |

The density of the mercerized CLP floc was higher than that of the non-mercerized CLP control. The CMC made in the high consistency reactor (from mercerized fibers) also showed large increases (149% for a 1% aqueous solution) in solution viscosity.

EXAMPLE 10

Never dried in process CLP (UVE grade) produced by Buckeye Technologies cellulose mill in Memphis, Tenn., was collected after digesting and bleaching and treated (at 3% consistency for 15 minutes) with 18% (w/w) sodium hydroxide at 216 g/L at 25° C. The pulp was then washed and treated with sulfuric acid at a 3.5% consistency. The pulp was formed into sheets with a Formette Dynamique hand sheet former and dried until the pulp was bone dry or had a 30% moisture content. The sheets were ground using a Wiley Mill grinder to form floc having an average floc length of 0.38 to 0.41 mm.

The floc was converted into CMC according to the procedure described in Example 1. Water additions were varied according to pulp moisture to ensure a constant water to cellulose ratio of about 2.6:1.

Two separate batches of CMC were prepared from each batch of treated cellulose pulp and tested.

For a control, a sample of the same never dried in process CLP was tested as described above, but was not mercerized with 18% (w/w) sodium hydroxide.

The results are shown in Table 10 below.

TABLE 10

Mercerization Effects on the Properties of
Never Dried CLP-derived Sheets, Floc and CMC

| Mercerizing Agent Treatment Level (NaOH (w/w)) | Control (0%) | Control (0%) | 18% | 18% |
|---|---|---|---|---|
| Sheet Moisture Content (% w/w) | Bone Dry | 30 | Bone Dry | 30 |
| Sheet Viscosity (cP) | 325 | 298 | 219 | 205 |
| Floc Viscosity (cP) | 249 | 260 | 185 | 173 |
| Average Floc Length (mm) | 0.38 | 0.39 | 0.41 | 0.40 |

TABLE 10-continued

Mercerization Effects on the Properties of
Never Dried CLP-derived Sheets, Floc and CMC

| Mercerizing Agent Treatment Level (NaOH (w/w)) | Control (0%) | Control (0%) | 18% | 18% |
|---|---|---|---|---|
| CMC 0.50% Viscosity (cP) | 615 | 616 | 1180 | 1332 |
| CMC 0.75% Viscosity (cP) | 2113 | 1944 | 3506 | 3505 |
| CMC 1% Viscosity (cP) | 25685 | 13920 | 55335 | 57190 |
| CMC DS | 0.827 | 0.830 | 0.787 | 0.791 |

The 18% sodium hydroxide mercerization treatment increased the 1% solution viscosity of CMC for both bone dry and 30% moisture content CLP.

EXAMPLE 11

Finished product CLP (HVE grade) produced by Buckeye Technologies cellulose mill in Memphis, Tenn., was ground into floc (having an average floc length of 0.39 mm) using a Wiley Mill grinder. The resulting floc was mercerized (at 3% consistency for 15 minutes at 25° C.) with 18% (w/w) sodium hydroxide at 216 g/L. The mercerized floc was then washed with water and treated with sulfuric acid and oxalic acid at a 3.5% consistency. The floc was dried in an oven at 71° C. for varying amounts of time. The floc was then converted into CMC according to the procedure described in Example 1. Water additions were varied according to pulp moisture to ensure a constant water to cellulose ratio of about 2.6:1.

Two separate batches of CMC were prepared from each batch of treated cellulose floc and tested.

For a control, CMC was dervied from the same floc, but was not mercerized with 18% sodium hydroxide.

The results are shown in Table 11 below.

TABLE 11

| Floc Mercerization Level (% NaOH) | Floc Moisture Content (% w/w) | Floc Viscosity (cP) | CMC Viscosity 0.50% (cP) | CMC Viscosity 1.0% (cP) | CMC DS |
|---|---|---|---|---|---|
| 18 | 53 | 152 | 915 | 6217 | 0.765 |
| 18 | 39 | 158 | 1107 | 6414 | 0.744 |
| 18 | 9 | 163 | 1002 | 6376 | 0.752 |
| Control | 7 | 195 | 524 | 5440 | 0.795 |

EXAMPLE 12

The finished product pulp samples used as starting materials in Examples 2, 4, 5, and 11 (i.e. SSK, NSS, SHK, and CLP, respectively) were tested as follows. Each sample was cut into strips. Each strip was mercerized in a liquid ammonia bath for 30 minutes at −50° C. to form cellulose III. The mercerized strips were then dried overnight in an oven at 105° C. The strips were ground using a Wiley Mill grinder to form a floc. The floc was converted into CMC according to the procedure described in Example 1. Two batches of CMC were prepared and tested per treatment and cellulose type.

As a control, CMC was prepared from the samples as described above, except the samples were not mercerized with liquid ammonia.

The results are shown in Table 12 below.

TABLE 12

| Cellulose Type/ Treatment | Sheet Viscosity (cP) | Floc Viscosity (cP) | Average Floc Length (mm) | Floc Density (g/mL) | Floc WRV's (%) | CMC Viscosity 0.50% (cP) | CMC Visc. 1.0% (cP) | CMC DS |
|---|---|---|---|---|---|---|---|---|
| CLP/ CONTROL | 319 | 200 | 0.37 | 0.1188 | 59.2 | 451 | 4158 | 0.859 |
| CLP/ Ammonia | 232 | 196 | 0.38 | 0.1139 | 55.6 | 473 | 3899 | 0.857 |
| SHK/ CONTROL | 12 | 12 | 0.34 | 0.0885 | 77.0 | 42 | 184 | 0.870 |
| SHK/ Ammonia | 11 | 10 | 0.33 | 0.0993 | 64.3 | 38 | 159 | 0.820 |
| SSK/ CONTROL | 28 | 26 | 0.42 | 0.1763 | 77.3 | 67 | 471 | 0.835 |
| SSK/ Ammonia | 20 | 19 | 0.41 | 0.1815 | 75.7 | 64 | 385 | 0.808 |
| NSS/ CONTROL | 64 | 59 | 0.39 | 0.0965 | 77.3 | 99 | 702 | 0.864 |
| NSS/ Ammonia | 44 | 40 | 0.39 | 0.1079 | 75.7 | 99 | 711 | 0.846 |

EXAMPLE 13

The finished product pulp samples used as starting materials in Examples 2 and 11 (i.e. SSK and CLP, respectively) were tested as follows. Each sample was cut into strips. Each strip was mercerized in a mixture of liquid ammonia (1700 mL) and methanol (300 mL) for 5 minutes at approximately −35° C. to form cellulose III. The mercerized strips were then allowed to air dry under a hood for 72 hours. The strips were ground using a Wiley Mill grinder to form a floc. The floc was converted into CMC according to the procedure described in Example 1. Two batches of CMC were prepared and tested per treatment and cellulose type.

As a control, CMC was prepared from the samples as described above, except the samples were not mercerized with liquid ammonia.

The results are shown in Table 13 below.

TABLE 13

| Mercerizing Agent | CLP | | SSK | |
|---|---|---|---|---|
| Treatment | Control | Ammonia | Control | Ammonia |
| Sheet Viscosity (cP) | 356 | 277 | 28 | 27 |
| Floc Viscosity (cP) | 216 | 239 | 26 | 25 |
| Average Floc Length (mm) | 0.40 | 0.41 | 0.43 | 0.41 |
| Floc Density (g/mL) | 0.101 | 0.091 | 0.144 | 0.153 |
| CMC 0.50% Viscosity (cP) | 727 | 478 | 70 | 55 |
| CMC 1% Viscosity (cP) | 5134 | 4135 | 404 | 316 |
| CMC DS | 0.839 | 0.848 | 0.852 | 0.860 |

All references cited herein are incorporated by reference. To the extent that a conflict may exist between the specification and the reference the language of the disclosure made herein controls.

What is claimed is:

1. A cotton linter pulp derived carboxymethyl cellulose having a solution viscosity of from 60,000 to about 100,000 cP in an aqueous solution consisting of 1% by weight of the carboxymethyl cellulose as measured according to ASTM D 2196.

2. A softwood kraft pulp derived carboxymethyl cellulose having a solution viscosity of from about 1,000 to about 1,600 cP in an aqueous solution consisting of 1% by weight of the carboxymethyl cellulose as measured according to ASTM D 2196.

3. A hardwood kraft pulp derived carboxymethyl cellulose having a solution viscosity of from about 1,000 to about 1,600 cP in an aqueous solution consisting of 1% by weight of the carboxymethyl cellulose as measured according to ASTM D 2196.

4. A wood pulp derived carboxymethyl cellulose having a solution viscosity of from about 1,800 to about 3,000 cP in an aqueous solution consisting of 1% by weight of the carboxymethyl cellulose as measured according to ASTM D 2196.

* * * * *